United States Patent [19]

Stahl et al.

[11] Patent Number: 5,196,482
[45] Date of Patent: Mar. 23, 1993

[54] THERMOPLASTIC MOLDING COMPOSITIONS

[75] Inventors: Peter O. Stahl, Mt. Vernon, Ind.; Eugen J. Geyer, Lenox, Mass.

[73] Assignee: General Electric Company, Pittsfield, Mass.

[21] Appl. No.: 562,209

[22] Filed: Jul. 31, 1990

[51] Int. Cl.$^5$ .................. C08L 31/02; C08L 67/02; C08L 79/08

[52] U.S. Cl. .................. 525/167; 525/166; 525/173; 525/176; 525/180

[58] Field of Search .............. 525/167, 180, 166, 173

[56] References Cited

U.S. PATENT DOCUMENTS

| | | | |
|---|---|---|---|
| 3,580,965 | 5/1971 | Brinkmann et al. | 260/873 |
| 3,937,757 | 2/1976 | Seydl | 260/873 |
| 4,275,180 | 6/1981 | Clarke | 525/173 |
| 4,322,333 | 4/1982 | Kochanowski et al. | 523/521 |
| 4,639,486 | 1/1987 | Liu | 525/180 |
| 4,739,012 | 4/1988 | Hagman | 525/173 |

FOREIGN PATENT DOCUMENTS 2011443  7/1979  United Kingdom .

*Primary Examiner*—Patricia A. Short
*Attorney, Agent, or Firm*—Andrew C. Hess

[57] ABSTRACT

Compositions comprising polyetherester resins, polyetherimide ester resins, alone or combined with polyester resins, and mixtures of any of them or of polyester resins alone with copolymers of alpha-olefins and vinyl esters of aliphatic monocarboxylic acids have improved elastomeric character. For example, addition of 50 and 30 parts by weight of a vinyl acetate-ethylene copolymer having a high content of units derived from vinyl acetate to a polyetherimide ester copolymer considerably improves compressibility, elasticity, low temperature impact strength, UV light resistance and chemical resistance. Articles shaped from such compositions show desirably lower hardness, improved dynamic fatigue properties, paintability, extrudability and injection moldability.

26 Claims, No Drawings

THERMOPLASTIC MOLDING COMPOSITIONS

This invention relates to improved thermoplastic molding compositions and, more particularly, to improved thermoplastic polyester and copolyester molding compositions comprising copolymers of alpha-olefins and vinyl esters of saturated aliphatic monocarboxylic acids.

BACKGROUND OF THE INVENTION

High molecular weight linear polyesters and copolyesters of glycols and terephthalic or isophthalic acid are described in, for example, U.S. Pat. Nos. 2,465,319 and 3,047,539.

U.S. Pat. No. 3,937,757 teaches that the tracking resistance of poly(1,4-butylene terephthalate) compositions can be improved by the addition of from 5 to 50% by weight of polyolefins or ethylene copolymers, containing at least 50% by weight of ethylene units, thereto.

U.K. Patent Application GB 2,011,443 describes high impact strength compositions comprising linear polyester resins and from 0.1 to 4.5% by weight of a copolymer of ethylene and vinyl acetate. Preferred such compositions can, on the one hand, can comprise copolymers containing "more than 50% by weight of vinyl acetate", and, on the other hand, "50% or less by weight, vinyl acetate". With respect to the latter, special mention is made of the ethylene-vinyl acetate copolymer containing 52% by weight vinyl acetate (Vynathene EY 904, sold by U.S.I. Chemicals). U.S. Pat. No. 3,580,965 describes high impact strength compositions comprising polyesters and alpha-olefin-vinyl ester copolymers containing in the copolymers from 30 to 99% by weight of units derived from the olefin.

U.S. Pat. No. 4,322,333 discloses reinforced copolyesters including minor, effective amounts of a copolymer of ethylene and vinyl acetate to improve impact strength.

U.S. Pat. No. 4,639,486 discloses flame retardant compositions comprising blends of a polyetherimide ester and a halogenated flame retarding material, optionally containing a modifier resin selected from condensation polymers and addition polymers; ethylene-vinyl acetate copolymers are not among those mentioned.

Vinyl acetate-ethylene polymerizates containing nominally 40 and 30% by weight of ethylene derived units are commercially available from Wacker-Chemie GmbH Munich, Germany under the Registered Trademark VAE. Such are recommended for use alone and in blends with other polymers, e.g., vinyl chloride polymers and polyolefins. A related commercially available copolymer of vinyl acetate and ethylene is sold by DIC Americas, Fort Lee, N.J., U.S.A., under the Registered Trademark EVATHLENE.

It has now been discovered that polymer blends comprising polyetherester resins, polyetherimide ester resins, alone, or combined with polyester resins or mixtures of any of them or of polyester resins alone with copolymers of alpha-olefins and vinyl esters of saturated aliphatic organic acids over a broad composition range will surprisingly provide improved compressibility, elasticity, low temperature impact strength, ultraviolet light- and chemical-resistance. Addition of the copolymers is also found to provide desirably lower Shore hardness, improved dynamic fatigue properties, paintability, extrudability and injection moldability. Elastomeric character especially is improved with polyester-polyether block copolymers. The new compositions can also contain reinforcing fillers and/or flame retardant agents.

SUMMARY OF THE INVENTION

According to this invention, in one of its major aspects, there are provided thermoplastic resin compositions comprising:
A. from about 5 to about 95 parts by weight of:
  (a) a polyetherester resin;
  (b) a polyetherimide ester resin; or
  (c) a mixture of either of the foregoing resins; and
B. from about 95 to about 5 parts by weight of:
  (a) a copolymer of an alpha-olefin of from 2 to 4 carbon atoms and a vinyl ester of a saturated aliphatic monocarboxylic acid of 2 to 13 carbon atoms; or
  (b) a mixture of such copolymers.

In preferred embodiments there are provided compositions as defined above wherein Component A comprises a polyetherimide ester resin, especially those wherein said polyetherimide ester resin (b) comprises units derived from (i) at least one low molecular weight diol, (ii) at least one dicarboxylic acid or chemical equivalent thereof, and (iii) a set of reactants selected from (a) (1) at least one high molecular weight poly(oxyalkylene)diamine and (2) at least one tricarboxylic acid or a derivative thereof, or (b) at least one high molecular weight polyalkylene diimide diacid; or a mixture of such resins, special mention being made of those wherein the diol component comprises 60 to 100 mole percent 1,4-butanediol; those wherein the dicarboxylic acid component comprises from 60 to 100 percent of dimethyl terephthalate; those wherein the polyoxyalkylene diimide diacid component is derived from one or more polyoxyalkylene diamines and one or more tricarboxylic acid compounds containing two vicinal carboxyl groups or an anhydride group and an additional carboxyl group, and is characterized by the following formula:

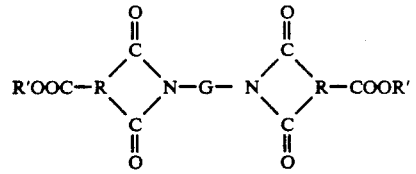

wherein each R is independently selected from the group consisting of $C_2$ to $C_{20}$ aliphatic and cycloaliphatic trivalent organic radicals and $C_6$ to $C_{20}$ aromatic trivalent organic radicals; each $R^1$ is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of from about 600 to 12,000; and those wherein the polyoxyalkylene diimide diacid is derived from trimellitic anhydride and a polyoxyalkylene diamine selected from the group consisting of polypropylene oxide diamine and a copoly(ethylene oxide-propylene oxide)diamine having predominately polyethylene oxide in the backbone.

Among the preferred features of the invention are compositions as defined above which also include A. (d) a polyester resin; or
  (e) a mixture of such resins.

Special mention is made of such compositions wherein components A (d) or (e) comprise a polyalkylene terephthalate resin; e.g., those comprising units derived from at least one low molecular weight diol, and, in particular, 1,4-butanediol.

In a further major aspect, the present invention contemplates thermoplastic resin compositions comprising:

A. from about 5 to about 95 parts by weight of:
  (a) a polyester resin; or
  (b) a mixture of such resins; and
B. from about 95 to about 5 parts by weight of:
  (a) a copolymer of an alpha-olefin of from 2 to 4 carbon atoms and a vinyl ester of a saturated aliphatic monocarboxylic acid of 2 to 13 carbon atoms; or
  (b) a mixture of such copolymers.

Preferred features of this aspect are compositions wherein Component A comprises a polyalkylene terephthalate resin, especially those wherein said resin (b) comprises units derived from (i) at least one low molecular weight diol, and, especially preferably, those wherein the diol component comprises 1,4-butanediol.

Special mention is made of compositions as defined under the preferred embodiments above wherein the weight ratio of (iii) to (ii) in the polyetherimide ester is from about 0.002 to 0.20:1, more preferably, from about 0.005 to about 0.15:1, and, most preferably, from about 0.005 to 0.10:1.

Also among the preferred features of the invention are compositions as defined above wherein said Copolymer B comprises ethylene as the alpha-olefin; compositions wherein copolymer B comprises vinyl acetate as the vinyl ester of a saturated aliphatic monocarboxylic acid; compositions wherein said copolymer B contains ethylene in an amount of from 25 to 75 percent by weight; and compositions wherein said copolymer B contains ethylene in an amount of from 25 to 50 percent by weight.

Also contemplated by the invention are compositions as first defined above which also include an effective amount of:

C. a reinforcing agent;
D. a flame retardant agent, alone, or in further combination with a synergist; or
E. a combination of C and D.

Special mention is made of compositions comprising from 40 to 80 parts by weight of component A and correspondingly from 60 to 20 parts by weight of component B based on 100 parts by weight of both A and B taken together.

In its broadest aspects the invention also contemplates shaped articles comprising thermoplastic compositions as above defined.

DETAILED DESCRIPTION OF THE INVENTION

The high molecular weight linear polyesters used in the practice of the present invention are polymeric glycol esters of terephthalic acid and isophthalic acids. They are available commercially or can be prepared by known techniques. See, for example, U.S. Pat. Nos. 2,465,319 and 3,047,539.

The glycol portion of the polyester contains from two to ten, preferably two to four, carbon atoms in the form of linear methylene chains.

The preferred polyesters will be high molecular weight polymeric glycol terephthalates or isophthalates having repeating units of the general formula:

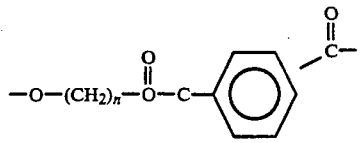

wherein n is 2, 3, or 4, and mixtures of such esters, including copolyesters of terephthalic and isophthalic acids of up to about 30 mole percent isophthalic acid units.

Especially preferred polyesters are poly(ethylene terephthalate) and poly(1,4-butylene terephthalate).

Illustratively, high molecular weight polyesters will have an intrinsic viscosity of at least about 0.4 deciliters/gram and, preferably, at least 0.7 deciliters/gram as measured in a 60:40 phenol tetrachloroethane mixture at 30 degrees C. At intrinsic viscosities of at least about 1.1 deciliters/gram, there is a further enhancement in toughness of the present compositions.

Suitable polyetherester resins include both random and block copolymers. In general these are prepared by conventional esterification/polycondensation processes from (a) one or more diols, (B) one or more dicarboxylic acids, (c) one or more long chain ether glycols, and, optionally, one or more caprolactones or polycaprolactones. In addition to being commercially available, the polyetheresters are described in U.S. Pat. Nos. 3,023,192; 3,651,014; 3,763,109; 3,766,146; 3,784,520; 3,801,547; 4,156,774; 4,264,761; 4,355,155; and 4,760,112.

Suitable diols (i) for use in preparing the polyetherimide ester resins used in the present invention include saturated and unsaturated aliphatic and cycloaliphatic dihydroxy compounds as well as aromatic dihydroxy compounds. These diols are preferably of a low molecular weight i.e. having a molecular weight of about 250 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3-, and 1,4-cyclohexane dimethanol, butenediol, hexenediol, etc. Especially preferred are 1,4-butanediol, and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis-(p-hydroxy phenyl)methane and bis-(p-hydroxyphenyl)-2,2-propane.

Especially preferred diols are the saturated aliphatic diols, mixtures thereof and mixtures of saturated diol(s) with unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic and/or aromatic dicarboxylic acids. These acids are preferably of a low molecular weight, i.e., having a molecular weight of less than about 300; However, in some cases higher molecular weight dicarboxylic acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. The molecular weight preference, mentioned above, pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom on an isolated or fused benzene ring system. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1,2-dicarboxylic acid, 2-ethylsuberic acid, tetramethylsuccinic acid, cyclopentanedicarboxylic acid, decahydro-1,2-naphthalene dicarboxylic acid, 4,4'-bicyclohexyl dicarboxylic acid, decahydro-2,6-naphthalene dicarboxylic acid, 4,4-methylenebis(cyclohexane carboxylic aced), 3,4-furan dicarboxylic acid and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene decarboxylic acid, 2,6-naphthalene dicarboxylic acid, 2,7-naphthalene dicarboxylic acid, phenanthrene dicarboxylic acid, anthracine dicarboxylic acid, 4,4'-sulfonyl dibenzoic acid, and halo and C$_1$-C$_{12}$ alkyl, alkoxy, and aryl ring substituted derivatives thereof. Hydroxy acids such as p-(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic or cycloaliphatic dicarboxylic acid, most preferably the aromatic dicarboxylic acids. Among the aromatic acids, those with 8-16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % dicarboxylic acid (b) be of the same dicarboxylic acid or ester derivative thereof. As mentioned above, the preferred compositions are those in which dimethyl terephthalate is the predominant dicarboxylic acid, most preferably when dimethyl terephthalate is the only dicarboxylic acid.

The polyetherimide ester polymers of the present invention may be prepared by a one-pot synthesis involving the reaction of the diol (i), the dicarboxylic acid (ii), the high molecular weight poly(oxyalkylene)diamine (iii) (a) (1), and the tricarboxylic acid or its derivative (iii) (a) (2). In such a synthesis the polyoxyalkylene diimide diacid (iii) (b) is formed in-situ by the reaction of the poly(oxyalkylene)diamine with the dicarboxylic acid.

The poly(oxyalkylene)diamines (iii) (a) (1) suitable for use in the present invention may be represented by the following general formula

$$H_2N-G-NH_2$$

wherein G is the radical remaining after the removal of the amino groups of a long chain alkylene ether diamine. These polyether diprimary diamines are available commercially from Texaco Chemical Company under the trademark JEFFAMINE. In general, they are prepared by known processes for the amination of glycols. For example, they may be prepared by aminating the glycol in the presence of ammonia, Raney nickel catalyst and hydrogen as set forth on Belgium Pat. No. 634,741. Alternately, they may be prepared by treating glycol with ammonia and hydrogen over a Nickel-Copper-Chromium catalyst as taught by U.S. Pat. Nos. 3,155,728 and 3,236,895 and French Patent Nos. 1,551,605 and 1,466,708.

The long chain ether diamines suitable for use herein are the polymeric diamines having terminal (or as nearly terminal as possible) amine groups and an average molecular weight of from about 600 to about 12,000 preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequent amination are useful. Especially preferred poly(alkylene ether) diamines are poly(propylene ether)diamine, poly(tetramethylene ether)diamine, and the poly(ethylene ether)glycols which are end-capped with poly(propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii) (a) (2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',5-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

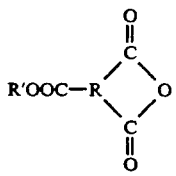

wherein:
R is a trivalent organic radical, preferably a $C_2$-$C_{20}$ aliphatic or cycloaliphatic, or $C_6$-$C_{20}$ aromatic trivalent radical;
R' is preferably hydrogen or a monovalent organic radical preferably selected from $C_1$-$C_6$ aliphatic and/or cycloaliphatic radicals and $C_6$-$C_{12}$ aromatic radicals, e.g., benzyl, most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii) (a) (1) a poly(oxyalkylene)diamine component, and (iii) (a) (2) a tricarboxylic acid component is described in U.S. Pat. No. 4,556,688 to McCready et al. In this type of one-pot reaction the amount of diol (i) employed will be, in general, a molar excess, preferably about 1.5 molar equivalents, based on the combined molar equivalents of dicarboxylic acid (ii) and of the total moles of the tricarboxylic acid (iii) (a) (2). The amount of the tricarboxylic acid employed will preferably be about two molar equivalents based on the number of moles of the poly(oxyalkylene)diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxyalkylene diamine) yield useful polymers.

The amount by which the diamine (iii) (a) (1) and the dicarboxylic acid (ii) are used in the present invention is important if polyetherimide ester polymers are desired which exhibit high flexural modulus and, therefore, greater stiffness, as well as improved solvent resistance. It is to be understood, however that such amounts are preferred but not critical, especially if low modulus is the desired property. For the so-called hard segmented embodiments, the amounts of the poly(oxyalkylene)diamine and dicarboxylic acid or its derivatives used must be such that the weight ratio of the theoretical amount of the polyoxyalkylene diimide diacid, formable from the poly(oxyalkylene)diamine and the tricarboxylic acid, to the dicarboxylic acid is from about 0.002 to 0.20:1, preferably from about 0.005 to about 0.15:1, and more preferably form about 0.005 to about 0.10:1. If this weight ratio in exceeded, i.e., is greater than 0.20:1, the flexural modulus will be adversely affected. That is to say, the flexural modulus will be lowered and might begin to approach that of the conventional polyetherimide esters, with a concomitant loss of stiffness. The solvent resistance of the instant polyetherimide esters might also be adversely affected.

The instant polyetherimide esters may also be prepared by a two-pot synthesis involving the reaction of the diol (i), the dicarboxylic acid (ii), and the polyoxyalkylene diimide diacid (iii) (b). Such a reaction is described in U.S. Pat. No. 4,556,705 to McCready. Basically, in this process the poly(oxyalkylene)diamine is reacted with the tricarboxlic acid to form a polyoxyalkylene diimide diacid, and the preformed polyoxylakylene diimide diacid is then reacted with the diol and the dicarboxylic acid to form the polyetherimide ester polymers.

The polyoxyalkylene diimide diacid (iii)(b) may be represented by the general formula

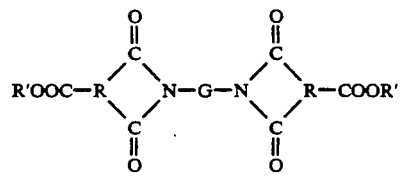

wherein G, R, and R' are as defined hereinabove.

The polyoxyalkylene diimide diacids of this formula suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly(oxyalkylene)diamine (iii)(a)(1). These polyoxyalkylene diimide diacids and processes for their preparation are disclosed on U.S. Pat. No. 4,556,705. Briefly, these polyoxylakylene diimide diacids may be prepared by known imidization, including melt synthesis, or by synthesizing in a solvent system. Such reactions will generally occur at temperatures from about 100 degrees C. to about 300 degrees C., preferably at temperatures from about 150 degrees C. to about 250 degrees C., while drawing off water or in a solvent system at the reflux temperature of the solvent or azeotropic (solvent) mixture.

In this two-pot process, as in the one-pot process described hereinabove, it is generally preferred that the diol be present in at least a molar equivalent amount, preferably a molar excess, most preferably at least 150 mole % based on the moles of dicarboxylic acid and polyoxylakylene diimide diacid combined. Such molar excess of diol will generally allow for optimal yields, based on the amount of acids, while accounting for the loss of diol during esterification.

In this two-pot process the amount of the polyoxyalkylene diimide diacid and dicarboxylic acid utilized is critical in providing those preferred polyetherimide esters exhibiting high flexural modulus, and also improved solvent resistance. The amount of the polyoxyalkylene diimide diacid used in any such case is such that the weight ratio of the polyoxyalkylene diimide diacid to the dicarboxylic acid is from about 0.002 to 0.20:1, preferably from about 0.005 to about 0.15:1, and more preferably from about 0.005 to about 0.10:1. Within this ratio the polymers exhibit high flexural modulus and also improved organic solvent resistance, i.e., they exhibit improved stiffness. If the weight ratio maximum of 0.20 is exceeded the flexular modulus of the polymers is lowered. Also the solvent resistance of these polymers is reduced, as explained above.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxyalkylene)diamine. Forming the prepolyester can be achieved by conventional esterification techniques such as those described in U.S. Pat. Nos. 2,465,319 and 2,910,466.

In its preferred embodiments, the composition of the instant invention will comprise the reaction products of dimethyl terephthalate, optionally with up to 40 mole % of another dicarboxylic acid; butanediol, optionally with another diol such as butenediol, hexanediol, or cyclohexane dimethanol; and either a poly(oxyalkylene)diamine having an average molecular weight of from about 600 to about 12,000, preferably from about 900 to about 4,000, and trimellitic anhydride, or a polyoxyalkylene diimide diacid. For reasons explained above in certain instances the weight ratio of the polyoxyalkylene diimide diacid to the dicarboxylic acid will be from about 0.002 to 0.20:1, preferably from about 0.005 to about 0.15:1, and more preferably from about 0.005 to about 0.10:1. In its more preferred embodiments the diol will be butanediol and the dicarboxylic acid will be 100 mole percent dimethyl terephthalate, and, in the special instances mentioned above, the weight ratio of the polyoxyalkylene diimide diacid to dicarboxylic acid will be from about 0.002 to 0.20:1, preferably from about 0.005 to about 0.15:1, and more preferably from about 0.005 to about 0.10:1.

In the process, particularly where all of the reactants are charged to the reactor together or where the polyoxyalkylene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxyalkylene)diamine. An excess of diamine reduces the degree of branching, while an excess of the tricarboxylic acid increases branching. In addition to controlling branching by varying the tricarboxylic acid/diamine mole ratio, one can compensate for branching by introducing a mon-functional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent generally will be less than 0.15 moles per mole of diimide diacid. Useful branching agents other than trimellitic anhydride include trimethyl trimellitate, glycerol, trimethylol propane, trimesic acid and its esters and the like.

The instant polyetherimide esters may be prepared by conventional esterification/condensation reactions for the production of polyesters. These processes are described, inter alia, in U.S. Pat. Nos. 3,763,109; 3,651,014; and 3,801,547, and in U.S. Pat. Nos. 4,556,705 and 4,556,688.

The polyetherimide esters of the instant invention contain at least the following two recurring structural units:

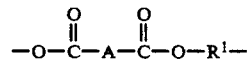

and

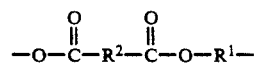

wherein:
A is the residue of the polyoxyalkylene diimide diacid absent the two carboxyl groups, i.e.,

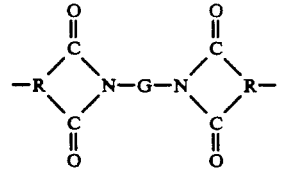

$R^1$ is the residue of the diol absent the two hydroxy groups; and
$R^2$ is the residue of the dicarboxylic acid absent the two carboxyl groups.

The amounts of the recurring structural units present in the above-mentioned family of preferred resins are generally such that the ratio, by weight, of recurring structural units of the first type to recurring structural units of the second type is from about 0.002 to 0.20:1, preferably from about 0.005 to about 0.15:1, and more preferably from about 0.005 to about 0.10:1.

Additionally, while not required, it is customary and preferred to utilize a catalyst in the process for the production of the polyetherimide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony tri-oxide and the like. These catalysts as well as additional useful catalysts are described in U.S. Pat. Nos. 2,465,319; 2,850,483; 2,892,871; 2,937,160; 2,998,412; 3,047,539; 3,110,693; and 3,385,830.

Where the reactants and reactions allow, it is preferred to use the titanium catalysts including the inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,076,952 among others. Especially preferred are the organic titanates such as tetra-butyl titanate, tetra-isopropyl titanate and tetraoctyl titanate and the complex titanates derived from alkali or alkaline earth metal alkoxides and titanate esters, most preferably the organic titantes. These too may be used alone or in combination with other catalysts such as for example, zinc acetate, manganese acetate or antimony trioxide, and /or with a catalyst quencher as described above. The catalyst is used in catalytic amounts, e.g., from about 0.005 to about 2 percent by weight based on total weight of reactants.

Both batch and continuous methods can be used for any stage of the ether imide ester polymer preparation. Polycondensation of the polyester propolymer with the polyoxyalkylene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

Although the polyetherimide esters used in this invention possess good resistance toward heat aging and photodegradation, it is advisable to stabilize these compounds by the addition of an antioxidant.

Many of the oxidative and/or thermal stabilizers known in the art for copolyesters may be used in the practice of the present invention. These may be incorporated into the composition either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some specific examples of these stabilizers are described in U.S. Pat. No. 4,556,688.

The polymers used on the compositions of this invention may be stabilized against ultraviolet radiation by the addition thereto of the well known ultra violet radiation absorbers such as, for example, the benzophenones, benzotriazoles, and cyanoacrylates.

Numerous copolymers may be used as copolymers of alpha-olefins with vinyl esters of saturated aliphatic monocarboxylic acids. Preferred procucts are copolymers of ethylene with vinyl acetate with ethylene contents of between 1 and 49, preferably 20 to 40% by weight, having an average molecular weight (for example weight average molecular weight of 10,000 to 500,000, preferably 50,000 to 300,000. They are obtained according to known methods and are available commercially. The compounds of the following general structure:

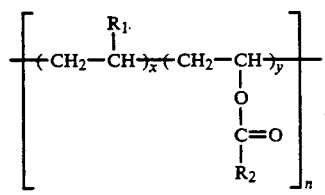

wherein $R_1$ is H, $CH_3$, $C_2H_5$ and $R_2$ is $CH_3$ to $C_{12}H_{25}$ and x, y and n represent integers, are preferentially suitable. Such compounds are copolymers of alpha-olefins having 2 to 4 carbon atoms and vinyl esters of saturated aliphatic monocarboxylic acids having 2 to 13 carbon atoms.

The compositions of the present invention are prepared in conventional ways. For example, in one way, the ethylene-vinyl acetate copolymer is put into an extrusion compounder with the polyetherimide ester or other resin to produce molding pellets. The copolymer is dispersed on a matrix of the polyetherimide ester or other resin in the process. In another procedure, the copolymer is mixed with the polyetherimide ester or other resin by dry blending, then either fluxed on a mill and comminuted, or they are extruded and chopped. The ethylene vinyl acetate copolymer or other copolymer can also be mixed with the powdered or granular polyetherimide ester or other resin and directly molded, e.g., by injection or transfer molding techniques.

Although it is not essential, best results are obtained if the ingredient are pre-compounded, pelletized, and then molded. Pre-compounding can be carried out in conventional equipment. For example, after carefully pre-drying the resin, e.g., at 125 degrees C. for 4 hours, a single screw extruder is fed with a dry blend of the polyetherimide ester or other resin and the ethylene-vinyl acetate copolymer or other copolymer, the screw extruder is fed with a dry blend of the polyetherimide ester or other resin and the ethylene-vinyl acetate copolymer or other copolymer, the screw employed having a long transition and metering section to ensure melting. On the other hand, a twin screw extrusion machine, e.g., a 28 mm Werner-Pfleiderer machine can be fed with resin and additive at the feed port. In either case, a generally suitable machine temperature will be about 232 to 300 degrees C.

The pre-compounded composition can be extruded and cut up into molding compounds such as conventional granules, etc., by standard techniques.

The compositions of this invention can be molded in any equipment conventionally used for thermoplastic compositions. For example, with poly(1,4-butylene terephthalate), good results will be obtained in an injection molding machine, e.g., of the Newbury type with conventional cylinder temperature, e.g., 232 degrees C., and conventional mold temperatures, e.g., 66 degrees C. On the other hand, with poly(ethylene terephthalate), because of the lack of uniformity of crystallization from interior to exterior of thick pieces, somewhat less conventional but still well-known techniques can be used. For example, a nucleating agent such as graphite or a metal oxide, e.g., ZnO or MgO can be included and standard mold temperatures of at least 110 degrees C. will be used.

Blending and molding parameters will not in general depart significantly from the foregoing if polyetherester resins and polyetherimide ester resins are substituted in whole or in part for polyester resins. Suitable conditions are well known to those skilled in this art and reference is also made to the patent literature referenced above with respect to the individual resins.

DESCRIPTION OF THE PREFERRED EMBODIMENTS

The following examples illustrate the compositions of the present invention. They are not to be construed to limit the claims in any manner whatsoever.

EXAMPLES 1 and 2

The following formulations are mechanically blended, then extruded and molded into test pieces in a Van Dorn injection molding machine. The properties, measured by ASTM D638, D790, D1054, D2240, and D395, as appropriate, are also summarized in the Table:

TABLE

| Example | 1A* | 1 | 2 |
| --- | --- | --- | --- |
| Ingredients(parts/wt) | | | |
| Polyetherimide ester resin$^a$ | 100.0 | 50.0 | 70.0 |
| Vinyl acetate-ethylene copolymer$^b$ | — | 50.0 | 30.0 |
| Properties | | | |
| Tensile Strength, psi | 2900 | 1070 | 760 |
| Tensile Elongation, % | 450 | 350 | 300 |
| Flexural modulus, psi | 12000 | 3100 | 1200 |
| Rebound Resiliance, % | 46 | 33 | 27 |
| Shore A Hardness | 96 | 81 | 68 |
| Shore D Hardness | 44 | 24 | 18 |
| Compression Set (% rec) (24 hr @ rt, 4000 psi) | — | 93 | 87 |
| 25% Deflection, Meth B | — | 64 | 64 |
| Melting Point, deg C. | 200 | 196 | 196 |

*Control
$^a$"LO-MOD" J-10, GE Plastics, Pittsfield MA 01201, U.S.A.
$^b$"VAE", —Wacker-Chemie GmbH, Munich, West Germany The foregoing results demonstrate that the addition of vinyl acetate to a polyetherimide ester provides vast improvements in elastomeric character, as well as improved compressibility, reduction in hardness, and improved dynamic fatigue properties in comparison with the control sample which does not employ the copolymer additive.

The patents, applications, publications and test methods mentioned above are incorporated herein by reference.

Many variations of the present invention will suggest themselves to those skilled in the art in light of the above detailed description. For example, small amounts of materials such as dyes, pigments, stabilizers and plasticizers and the like can be added to the present compositions. Reinforcing glass fibers can be added in conventional amounts, e.g., 10, 20, and 30% by weight, based on resin content plus filler. Instead of glass, clay, talc asbestos, wollastonite, and the like can be used as fillers. The compositions can be rendered flame retardant with conventional flame retarding agents, such as halogenated aromatic compounds like decabromodiphenyl ether, alone, or combined with synergists, such as antimony oxide. Instead of polyetherimide esters, the copolymers can be used to improve the properties of polyesters such as poly(1,4-butylene terephthalate) resins, polyetherester resins, blends of poly(1,4-butylene terephthalate) resin with polyetherester resin, and the like. Also the polyetherimide ester resins exhibiting higher flexural modulus disclosed in U.S. Pat. No. 4,760,112, and described above can be used. All such obvious modifications are within the full intended scope of the appended claims.

We claim:

1. A thermoplastic resin composition comprising:
   A. from about 5 to about 95 parts by weight of a polyetherimide ester resin; and
   B. from about 95 to about 5 parts by weight of:
      (a) a copolymer of an alpha-olefin of from 2 to 4 carbon atoms and a vinyl ester of a saturated aliphatic monocarboxylic acid of 2 to 13 carbon atoms; or
      (b) a mixture of such copolymers.

2. A composition as defined in claim 1 wherein said polyetherimide ester resin comprises units derived from (i) at least one low molecular weight diol, (ii) at least one dicarboxylic acid or chemical equivalent thereof, and (iii) a set of reactants selected from (a) (1) at least one high molecular weight poly(oxyalkylene)diamine and (2) at least one tricarboxylic acid or a derivative thereof, or (b) at least one high molecular weight polyalkylene diimide diacid; or a mixture of such resins.

3. A composition as defined in claim 2 wherein the diol component comprises 60 to 100 mole percent 1,4-butanediol.

4. A composition as defined in claim 2 wherein the dicarboxylic acid component (ii) comprises from 60 to 100 percent of dimethyl terephthalate.

5. A composition as defined in claim 2 wherein (iii) is (b).

6. A composition as defined in claim 2 wherein (iii) is (b).

7. A composition as defined in claim 2 wherein the polyoxyalkylene diimide diacid component (b) is derived from one or more polyoxyalkylene diamines and one or more tricarboxylic acid compounds containing two vicinal carboxyl groups or an anhydride group and an additional carboxyl group, and is characterized by the following formula:

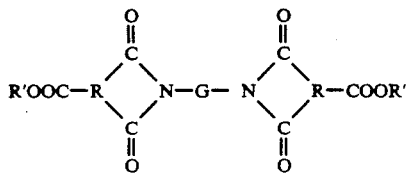

wherein each R is independently selected from the group consisting of $C_2$ to $C_{20}$ aliphatic and cycloaliphatic trivalent organic radicals and $C_6$ to $C_{20}$ aromatic trivalent organic radicals; each R' is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of from about 600 to 12000.

8. A composition as defined in claim 7 wherein the polyoxyalkylene diimide diacid is derived from trimellitic anhydride and a polyoxyalkylene diamine selected from the group consisting of polypropylene oxide diamine and a copoly(ethylene oxide-propylene oxide)-diamine having predominantly polyethylene oxide in the backbone.

9. A composition as defined in claim 2 wherein the weight ratio of (iii) to (ii) is from about 0.002 to 0.20:1.

10. A composition as defined on claim 9 wherein said weight ratio of (iii) to (ii) is from about 0.005 to about 0.15:1.

11. A composition as defined in claim 10 wherein said weight ratio of (iii) to (ii) is from about 0.005 to 0.10:1.

12. A composition as defined in claim 1 wherein said copolymer B comprises ethylene as the alpha-olefin.

13. A composition as defined in claim 1 wherein copolymer B comprises vinyl acetate as the vinyl ester of a saturated aliphatic monocarboxylic acid.

14. A composition as defined in claim 1 wherein copolymer B contains ethylene in an amount of from 25 to 75 percent by weight.

15. A composition as defined in claim 14 wherein said copolymer B contains ethylene in an amount of from 25 to 50 percent by weight.

16. A composition as defined in claim 1 which also includes an effective amount of:
C. a reinforcing agent;
D. a flame retardant agent, alone or in further combination with a synergist; or
E. a combination of C and D.

17. A composition as defined in claim 1 comprising from 40 to 80 parts by weight of component A and correspondingly from 60 to 20 parts by weight of component B based on 100 parts by weight of both A and B taken together.

18. A shaped article comprising a thermoplastic composition as defined in claim 1.

19. A thermoplastic resin composition comprising:

(A) from about 5 to about 95 parts by weight of a mixture of a polyetherester resin and a polyetherimide ester resin; and
(B) from about 95 to about 5 parts by weight of:
(a) a copolymer of an alpha-olefin of from 2 to 4 carbon atoms and a vinyl ester of a saturated aliphatic monocarboxylic acid of 2 to 13 carbon atoms or
(b) a mixture of such copolymers;
(c) optionally, an effective amount of a reinforcing agent; and
(d) optionally, an effective amount of a flame retardant agent, alone or in further combination with a synergist.

20. A composition as defined in claim 19 wherein said Copolymer B comprises ethylene as the alpha-olefin.

21. A composition as defined in claim 19 wherein copolymer B comprises vinyl acetate as the vinyl ester of a saturated aliphatic monocarboxylic acid.

22. A composition as defined in claim 19 wherein said copolymer B contains ethylene in an amount of from 25 to 75 percent by weight.

23. A composition as defined in claim 22 wherein said copolymer B contains ethylene in an amount of from 25 to 50 percent by weight.

24. A composition as defined in claim 19 comprising from 40 to 80 parts by weight of component A and correspondingly from 60 to 20 parts by weight of component B based on 100 parts by weight of both A and B taken together.

25. A shaped article comprising a thermoplastic composition as defined in claim 19.

26. A thermoplastic resin composition consisting of:
(A) from about 5 to about 95 parts by weight of a mixture of a polyetherester resin and a polyetherimide ester resin; and
(B) from about 95 to about 5 parts by weight of:
(a) a copolymer of an alpha-olefin of from 2 to 4 carbon atoms and a vinyl ester of a saturated aliphatic monocarboxylic acid of 2 to 13 carbon atoms or
(b) a mixture of such copolymers;
(c) optionally, an effective amount of a reinforcing agent; and
(d) optionally, an effective amount of a flame retardant agent, alone or in further combination with a synergist. 1

* * * * *